US006756115B2

(12) United States Patent
Fu et al.

(10) Patent No.: US 6,756,115 B2
(45) Date of Patent: Jun. 29, 2004

(54) 3D STRUCTURAL SILICEOUS COLOR PIGMENTS

(75) Inventors: Guoyi Fu, Savannah, GA (US); Diane Lewis, Savannah, GA (US)

(73) Assignee: EM Industries, Inc., Savannah, GA (US)

( * ) Notice: Subject to any disclaimer, the term of this patent is extended or adjusted under 35 U.S.C. 154(b) by 52 days.

(21) Appl. No.: 09/997,286

(22) Filed: Nov. 30, 2001

(65) Prior Publication Data

US 2003/0008771 A1 Jan. 9, 2003

Related U.S. Application Data

(60) Provisional application No. 60/253,932, filed on Nov. 30, 2000.

(51) Int. Cl.[7] .................................................. B32B 5/16

(52) U.S. Cl. ....................... 428/402; 427/189; 427/190; 427/212; 428/323; 428/327; 428/328; 428/329; 428/331; 428/332

(58) Field of Search ................................ 428/402, 323, 428/331, 327, 328, 329, 332; 427/212, 189, 190

(56) References Cited

U.S. PATENT DOCUMENTS

| | | | |
|---|---|---|---|
| 3,138,475 | A | 6/1964 | Schroder et al. |
| 3,497,367 | A | 2/1970 | Gaskin et al. |
| 3,883,368 | A | 5/1975 | Kordesch et al. |
| 4,028,215 | A | 6/1977 | Lewis et al. |
| 4,072,586 | A | 2/1978 | De Nora et al. |
| 4,221,853 | A | 9/1980 | Tye et al. |
| 4,405,699 | A | 9/1983 | Kruger |
| 4,422,917 | A | 12/1983 | Hayfield |
| 4,451,412 | A | 5/1984 | Loiseaux |
| 4,451,543 | A | 5/1984 | Dzieciuch et al. |

(List continued on next page.)

FOREIGN PATENT DOCUMENTS

| | | | |
|---|---|---|---|
| DE | 4316814 | A1 | 11/1994 |
| DE | 19641970 | | 4/1998 |
| DE | 19842134 | A1 | 4/2000 |
| DE | 19929109 | A1 | 12/2000 |
| EP | 0041388 | | 12/1981 |
| EP | 0 747 982 | | 11/1996 |
| EP | 0216278 | A2 | 4/1998 |
| FR | 2418965 | | 9/1979 |
| JP | 57090872 | | 6/1982 |
| WO | 92/17910 | | 10/1992 |
| WO | WO 93/08237 | A1 | 4/1993 |
| WO | WO 63/25611 | A1 | 12/1993 |
| WO | 96/38866 | | 12/1996 |
| WO | 97/13285 | | 4/1997 |
| WO | WO 97/43346 | A1 | 11/1997 |
| WO | WO 97/43348 | A1 | 11/1997 |

OTHER PUBLICATIONS

US 5,571,466, 11/1996, Dowling (withdrawn)

Joannopoulos, et al., Photonic Crystals, Molding the Flow of Light, 1995, pp. 1–137.

Velev et al., A Class of Microstructured Particles Through Colloidal Crystallization, Mar. 24, 2000, vol. 287, pp. 2240–2243.

(List continued on next page.)

*Primary Examiner*—H. Thi Le
(74) *Attorney, Agent, or Firm*—Millen, White, Zelano & Branigan, P.C.

(57) ABSTRACT

The invention relates to particles with opalescent effect—especially 3-D structural color pigments-based on solid colloidal crystals of monodispersed spheres and the manufacturing processes suitable for large-scale production of such solid colloidal crystal products. The particles with opalescent effect contain a sphere based crystal structure (or super-lattice) built up by monodisperse spheres and one or more secondary types of much smaller colloidal particles occupying partially or completely the empty spaces between the monodisperse spheres.

20 Claims, 3 Drawing Sheets

U.S. PATENT DOCUMENTS

| | | | | |
|---|---|---|---|---|
| 4,627,689 | A | | 12/1986 | Asher |
| 4,680,204 | A | * | 7/1987 | Das et al. |
| 4,775,520 | A | | 10/1988 | Unger et al. |
| 4,911,903 | A | | 3/1990 | Unger et al. |
| 4,986,635 | A | | 1/1991 | Spry |
| 5,131,736 | A | | 7/1992 | Alvarez |
| 5,153,081 | A | | 10/1992 | Thackeray et al. |
| 5,156,934 | A | | 10/1992 | Kainthia et al. |
| 5,312,484 | A | * | 5/1994 | Kaliski |
| 5,330,685 | A | | 7/1994 | Panzer |
| 5,337,185 | A | | 8/1994 | Meier |
| 5,342,552 | A | | 8/1994 | Panzer |
| 5,342,712 | A | | 8/1994 | Mieczkowska et al. |
| 5,385,114 | A | | 1/1995 | Milstein |
| 5,559,825 | A | | 9/1996 | Scalora |
| 5,582,818 | A | * | 12/1996 | Nakanishi et al. |
| 5,599,644 | A | | 2/1997 | Swierbut et al. |
| 5,618,872 | A | | 4/1997 | Pohl et al. |
| 5,645,929 | A | | 7/1997 | Debe |
| 5,656,250 | A | * | 8/1997 | Tanaka et al. |
| 5,658,693 | A | | 8/1997 | Thackeray et al. |
| 5,684,817 | A | | 11/1997 | Houdre |
| 5,698,342 | A | | 12/1997 | Klein |
| 5,712,648 | A | | 1/1998 | Tsujiguchi |
| 5,740,287 | A | | 4/1998 | Scalora |
| 5,748,057 | A | | 5/1998 | De Los Santos |
| 5,804,919 | A | | 9/1998 | Jacobsen |
| 5,846,310 | A | | 12/1998 | Noguchi et al. |
| 5,907,427 | A | | 5/1999 | Scalora |
| 6,261,469 | B1 | * | 7/2001 | Zakhidov et al. |
| 6,402,876 | B1 | * | 6/2002 | McArdle et al. |

OTHER PUBLICATIONS

Bertone, et al., "Thickness Dependence of the Optical Properties of Ordered Silica–Air and Air–Polymer Photonic Crystals", Jul. 12, 1999, vol. 83, No. 2, pp. 300–303.

Bogush, et al. "Preparation of Monodisperse Silica Particles: Control of Size of Mass Fraction," Journal of Non–Crystalline Solids, vol. 104 pp. 95–106 (1988).

Stober et al., "Controlled Growth of Monodisperse Silica Spheres in the Micron Size Range", 1968, pp. 63–69.

Srinivasarao, "Nano–Optics in the Biological World: Beetles, Butterflies, Birds, and Moths", Chem. Rev. 1999, pp. 1935–1961.

Sanders, "Diffraction of Light by Opals," *ACTA Crystallographica*, vol. A24, 1968, pp–427–434.

Sanders, "Colour of Precious Opal," Nature, vol. 204, pp 1151–1153 (Dec. 19, 1964).

Asher et al., "Self–Assembly Motif for Creating Submicron Periodic Materials. Polymerized Crystalline Colloidal Arrays," J. Am. Chem. Soc. 1994, 116, pp 4997–4998.

Park et al., "Assembly of Mesoscale Particles over Large Areas and its Application in Fabricating Tunable Optical Filters," Langmuir 1999, 15, pp 266–273.

Wijnhoven et al., "Preparation of Photonic Crystals Made of Air Spheres in Titania," Science, vol. 281, pp. 802–804, (Aug. 7, 1998).

Zakhidov et al., "Carbon Structures with Three–Dimensional Periodicity at Optical Wavelengths," Science, vol. 282, pp 897–901 (Oct. 30, 1998).

Ames Laboratory Condensed Matter Photonic Band Gap Homepage, Internet, Last Updated Aug. 12, 1996, 28 pages.

JΔJ Papers and Publications by Group Members, Internet, 9 pages.

Photonic Band Gap Materials, Cassagne et al. Internet, Last Updated Apr. 30, 1998, 7 pages.

Photonic Band Gap Materials Research, Opto–Electronics Research Group University of Glasgow, Internet, 5 pages.

Opal Photonic Microstructures, De La Rue et al., Internet, 2 pages.

Diffraction by Periodic Structures, Internet, Apr. 7, 1995, 7 pages.

Photonic Crystals, Albert Bimer, Internet, Mar. 4, 1999, 3 pages.

Research Topic "Switchable Window Glass", Internet, Jun. 21, 2000, 4 pages.

Dr. Zhong Lin 'ZL' Wang, Internet, 4 pages.

Nagayama Protein Array, Dr. Kuniaki Nagayama, Internet, Feb. 14, 2000, 5 pages.

Porous Materials/Photonic Crystals, Internet, Feb. 22, 2000, 5 pages.

Symposium B: Structure and Mechanical Properties of Nanophase Materials: Theory and Computer Simulations vs Experiment, Call For Papers, MRS 2000, Mar. 21, 2000, 2 pages.

Large–scale synthesis of a silicon photonic crystal with a complete three–dimensional bandgap near 1.5 micrometers, Blanco et al., Letters to Nature, May 25, 2000, 1 pages.

Samson A Jenekhe, Internet, 2 pages.

Electrical Engineering Department Opto–Electronics Group homepage, University of California—Los Angeles, Internet, Apr. 7, 1995, 2 pages.

Interesting Research Links and General Physics Links, Universiteit Van Amsterdam, Internet, Apr. 14, 1999, 3 pages.

University of Delaware, Physics and Astronomy, Internet, 1997, 9 pages.

Research Activities—Physical Sciences, Internet, 17 pages.

Conferences, Internet, 29 pages.

MURI Faculty Roster, Internet, 1996, 43 pages.

Author Listing, 116 pages.

Technology Development Laboratories, Internet, pp. 7.

Application Abstacts of JP application Nos.: JP 97–330388 971201, JP 95–69008 950328, JP 94–54890 940228, JP 92–356783 921222, JP 92–24927 920212; Application Abstracts of WO application Nos.: WO 98–CA1069 981118, WO 97–US14647 970820, WO 96–US3432 960313, WO 96–EP1448 960402, WO 90–US6013 901018; Application Abstracts of DE application Nos.: DE 95–19532543 950904, DE 95–19515820 950429, DE 94–4428851 940804, DE 95–1929332 950809, DE 91–4118185 910603, DE 88–3813224 880420; Application Abstracts of EP application Nos.: EP 98–112985 980713, and EP 97–810951 971205; Application Abstracts of US application Nos.: US 96–613194 960308, US 95–576812 951221, US 95–576811 951221.

Application Abstracts of JP application Nos.: JP 84–109596 840531, JP 97–147391 970605, JP 97–128713 970519; Application Abstracts of WO application Nos.: WO 92–RU259 921230, WO 97–US15938 970909, WO 97–US19592 971024, WO 89–GB532 890517; Application Abstracts of SU application Nos.: SU 660908; Application Abstracts of EP application Nos.: EP 94–250110 940428, EP 85–304430 850620; Application Abstracts of RO application Nos.: RO 81–104094 810422; Application Abstracts of GB application Nos.: GB 97–3084 970214; Application Abstracts of CN application Nos.: CN 87–10547 870808; Application Abstracts of US application Nos.: US 660617; US 3497367 700224, Application: DE Priority: US 680719, Application: GB Priority: US 660516, US 97–819240 970317, US 95–561162 951121.

Research with phrase, "colloidal crystal" to uncover abstracts containing colloidal crystal: Application Abstracts of JP application Nos.: JP 97–192495 19970717, JP 93–36980 19930225, JP 88–20177 19880129, JP 86–246795 19861017, JP 85–70472 19850402, JP 85–70471 19850402, JP 82–175933 19821006, JP 78–147247 19781130, JP 78–119979 19780929, JP 73–66363 19730614; Application Abstracts of DE application Nos.: DE 97–19747387 19971027, DE 87–3700299 19870107 Application Abstracts of GB application Nos.: GB 94–23779 19941125, GB 88–11894 19880519, Application Abstracts of EP application Nos.: EP 92–400602 19920309, EP 91–200406 19910226, EP 85–304430 19850620; Application Abstracts of SE application Nos.: SE 71–4136 19710330; Application Abstracts of FR application Nos.: FR 72–10248 19720323, FR 19631231; Application Abstracts of US application Nos.: US 89–457674 19891227, US 77–836935 19770927; US 19700423, US 19690623.

Research with phrase, "photonic crystal or colloidal crystal" to uncover abstracts containing "photonic crystal": Application Abstracts of JP application Nos.: JP 98–356565 19981215, JP 98–336945 19981127, JP 98–297516 19980912, JP 98–68488 19980318, JP 97–352740 19971222, JP 97–357673 19971225, JP 97–245534 19970910, JP 97–237094 19970902, JP 97–229652 19970826, JP 97–439 19970106, JP 96–34543 19960222, JP 96–30382 19960219, JP 95–160505 19950627, JP 95–96532 19950421, JP 95–88759 19950322, JP 94–153535 19940705, JP 93–154169 19930531, JP 92–321134 19921105, JP 92–245927 19920821, JP 91–322310 1991112, JP 90–89581, 19900403, JP 89–344546 19891228, JP 89–80693 19890331, JP 89–151524 19890614, JP 89–35728 19890215, JP 89–3441 19890110, JP 89–19815 19890131, JP 88–192785 19880803, JP 88–55723 19880309, JP 88–134411 19880602, JP 88–58263 19880314, JP 88–50279 19880302, JP 88–55724 19880309, JP 85–249228 19851107, JP 86–249786 19861022, JP 85–171247 19850805, JP 84–271368 198.

Research with phrase, "anodize or anodization" to uncover 44 abstracts containing "anodization," refined with phrase "metal or metal oxide" and "submicron structure or nanostructure," 21 pages.

Research with phrases, "anodize or anodization," refined with phrases "metal or metal oxide," and "alumina or silica or titania," and refined by document type "Review" to uncover 35 abstracts, 16 pages.

Abstracts, 66 pages.

Research with phrase, "Vacuum Belt Filter" to find 127 abstracts, 49 pages.

Research with phrase "opal" and refined by document type "patent" to uncover 174 abstracts, 71 pages.

Application Abstracts of JP application Nos.: JP 70–35125 700425; Application Abstracts of EP application Nos.: EP 90–105362 900321, EP 89–114724 890809; Application Abstracts of CA application Nos.: CA 86–516606 860822; Application Abstracts of US application Nos.: US 85–736027 850520, US 84–680456 841211, US 85–691099 850114.

97 Abstracts, 42 pages.

Online Search Request for term, "opals," with Nerac, Inc., Jan. 18, 1999, 31 pages.

Online Search Request for term, "silica spheres," with Nerac Inc., Mar. 12, 1999, 73 pages.

Communications and Photonics Laboratory, HRL Laboratories homepage, Internet, Dec. 23, 1998, 9 pages.

Short History of Localization of Light, Universiteit of Amsterdam, Internet, 5 pages.

Jonathan P. Dowling, PhD, Internet, no later than May 1, 1993, 3 pages.

Axel Scherer, Internet, 2 pages.

George M. Whitesides, Mallinckrodt Professor of Chemistry, Internet, 3 pages.

Younan Xia, University of Washington—Department of Chemistry, Internet, 2 pages.

Photonics' Vision, Honeywell website, Internet, last modified Apr. 7, 2000, 33 pages.

Stephen Mann, Internet, 3 pages.

Research Roadmap for Quantum Communication and Quantum Memory, U.S. Army Research Office Website, Internet, 20 pages.

Near–Term Research Strategy for Quantum Computing and Quantum Information Science, Henry O. Everitt, U.S. Army Research Office Website, Internet, Feb. 1998, 14 pages.

Southern Water Technologies, Inc., Representation Listing, 1 page.

Photonic & Sonic Band–Gap Bibliography, Internet, last revised Mar. 30, 1999, 54 pages.

Nerac, Inc. Online search of "Opalescent," Jan. 19, 1999, 57 pages.

Dr. Michael Scalora, Time Domain: The New Wireless Medium, Internet, Copyright 1999, 1 page.

Lagendijk et al., Life after a mean free path, Universiteit van Amsterdam website, Internet, 11 pages.

Wiersma et al., Laser action in very white paint, Internet, 11 pages.

The University of Sydney Australia website, The Sir Frank Packer Department of Theoretical Physics, Internet, last updated Dec. 11, 1997, 9 pages.

D–Star Technologies website, Internet, Copyright 1999, 4 pages.

Scientific Working Group Colloidal Physics, Homepage of SWB KoMa 336, Internet, 6 pages.

R.Sprik, Programs to calculate the photonic band structure of crystals with spherical atoms, Internet, revised Feb. 1999, 4 pages.

Willem L. Vos, Universiteit van Amsterdam website, Internet, Last modified Apr. 8, 1999, 5 pages.

Dr. T.F. Krauss, Internet, 1 page.

Photonic Band Gap Materials Research, Internet, 6 pages.

Members of Yoshino Laboratory, Internet, Last Update Jun. 5, 1998, 8 pages.

Max–Planck–Institut Für Mikrostuk, Internet, Apr. 29, 1999, 24 pages.

Photonic crystal makes excellent omnidirectional mirror, Inside R&D, Internet, Jun. 25, 1999, 1 page.

Vlasov et al., Semiconductor Quantum–Dot Photonic Crystals, Internet, last modified Apr. 9 or Jan. 13, 1999, 36 pages.

On photonic bandgap, light localization and random lasers our newest results, Universiteit van Amsterdam, Internet, Updated Apr. 16, 1999, 16 pages.

Soft Condensed Matter, Department of Physics and Astronomy, University of Pennsylvania, Internet, last modified Jul. 16, 1999, 2 pages.
Murray et al., Colloidal Crystals, American Scientist, Internet, May–Jun. 1995, 1 page.
Ozin, Geoffrey A., Self–Assembly in Space, Internet, 3 pages.
Optoelectronics Research Centre, University of Southampton, Internet, 1 page.
Torres, Clivia M. Sotomayor, Welcome to the Optical Nanostructures Laboratory, Internet, updated Aug. 18, 1998, 9 pages.
University of Tokushima, Graduate School of Engineering, Department of Ecosystem, Internet, Jan. 24, 1999, 1 page.
Photonic Research Ontario, Internet, 4 pages.
Some references on colloidal crystals, Internet, Jun. 25, 1999, 4 pages.
Photonic Crystals and Light Localization, NATO Advanced Study Institute, Internet, Last Update May 31, 1999, 3 pages.
Optoelectronics Group–Research, University of Bath, Internet, Last Update Sep. 17, 1999, 8 pages.
Overview of Molecular Nanotechnology, Zyvex website, Internet, last update Sep. 1, 1999, 5 pages.
Patents on Photonic Band Gap and related materials, Internet, last modified Jan. 13, 1999, 4 pages.
Latest Photonic and Acoustic Band–Gap Papers Collection, Internet, posted Dec. 19, 1999, 5 pages.
Halas Nanoengineering Group: Steve Oldenburg, Internet, 1 page.
Zhengdong Cheng, Resume, 3 pages.
Curriculum Vitae, Andrew L. Reynolds, OptoElectronics Research Group, Internet, Last Updated May 19, 1999, 4 pages.
Misha Boroditsky, Internet, last Update Sep. 28, 1998, 11 pages.
Yuril Vlasov's CV, Internet, 8 pages.
Reversible Logic, Nanotechnology website, 2 pages.
Toth–Fejel, Tihamer, LEGO(TM)s to the Stars: Active MesoStructures, Kinetic Cellular Automata, and Parallel Nanomachines for Space Applications, Internet, published in *The Assembler*, vol. 4 No. 3, Third Quarter, 1996, 20 pages.
Memranes for OEM Industrial Applications: Emflon® PTFE Membrane, Pall Corporation Internet Website, 3 pages.
Membrane Separation Systems, Envirosense Homepage, Last Updated Nov. 10, 1995, 4 pages.
Shaw, Leon L., Internet, 2 pages.
Shaw, Leon L., Mechanically Activated Synthesis of Nanostructured Carbides and Nitrides, Internet, 5 pages.
L. Takacs, Mechanochemistry: Summary and Papers, Internet, 12 pages.
Velev, Orlin D., homepage, Internet, Last Revised Mar. 1999, 9 pages.
Kaler, Eric D., Chemical Engineering University of Delaware, Internet, last revised Aug. 3, 1999, 4 pages.
Other groups involved in optical studies of colloidal crystals and opals, Internet, Aug. 10, 1999, 10 pages.
Spence, Bill, Nanotechnology Magazine, Internet, 23 pages.
The Foundations of Next–Generation Electronics: Condensed–Matter Physics at RLE, RLE Currents, Internet, V.10, No.2: Fall 1998, 43 pages.
Magnetic Spheres Research, SciFinder, Jun. 12, 2000, 20 pages.
Composite Spheres Research, SciFinder, Jun. 12, 2000, 5 pages.
Metal Oxide in Spheres Research, SciFinder, Jun. 12, 2000, 19 pages.
PECS, International Workshop on Photonic and Electromagnetic Crystal Structures, Internet, Mar. 8–10, 2000, Sendai Daini Washington Hotel, Sendai, Japan, 6 pages.
Nanotechnology and the Next 50 Years, R.E. Smalley Presentation, University of Dallas, Board of Councilors, Dec. 7, 1995, 32 pages.
Spence, Bill, Nanotechnology Health, NanoTechnology Magazine, Internet, last update Aug. 23, 1999, 4 pages.
Spence, Bill, Atoms: How Small? How Strong?, NanoTechnology Magazine, Internet, last update Aug. 23, 1999, 2 pages.
What is Nanotechnology?, NanoTechnology Magazine, Internet, last update Sep. 19, 1999, 7 pages.
Smart and Super Materials . . . , Nano Technology Magazine, Internet, last update Aug. 23, 1999, 5 pages.
Spence, Bill, The Nanotechnology Ecology, NanoTechnology Magazine, Internet, last update Aug. 23, 1999, 4 pages.
Spence, Bill, The Nanotechnology Ecomony, NanoTechnology Magazine, Internet, last update Aug. 23, 1999, 5 pages.
Spence, Bill, Why is Nanotechnology Happening?, Nano Technology Magazine, Internet, last update Feb. 16, 1999, 3 pages.
Velev, Orlin D., Colloidal Crystallization in 2D and 3D: The Quest for Novel Materials, Copyright 1998, 75 pages.
Hide, et al., New Developments in the Photonic Applications of Conjugated Plymers, Acc.Chem.Res., 30(10), 430–436 (1997); Internet copy, 22 pages.
Magnetic Latex Research, SciFinder, Jun. 12, 2000, 58 pages.
UV Absorbing Latex, SciFinder, Jun. 12, 2000, 33 pages.
Enviroquip,–handout, 2 pages.
Laboratory for Nanotechnology at Clemson University, Internet, Jul. 1999, 19 pages.
Belt Filters, Internet 4 pages.
Yahoo Web Search for "belt filters," Internet, 8 pages.
AFS Corporate Sponsors, Internet, 2 pages.
AFS Call for Papers, no later than Sep. 15, 1999, for Filtration and Separation Technologies for 2000, Mar. 14–17, 2000, Myrtle Beach Convention Center, Myrtle Beach, South Carolina, 2 pages.
Daniel L. Feldheim, Internet, last update Jun. 1999, 9 pages.
Directed Studies: Andreas Stein, Chemistry University of Minnesota, Internet, last modified Apr. 19, 1999, 6 pages.
Asher Research Group, Internet, May 1999, 6 pages.
Useful Software for Photonic Band Gap calculations, Internet, last update Sep. 30, 1998, 10 pages.
Literature References about Colloidal Crystals, Internet, Jul. 29, 1998, 4 pages.
Patents of Photonic Band Gap and related materials, Internet, last modified Aug. 13, 1999, 3 pages.
Vicki Leigh Colvin, Rice Chemistry, Internet, last modified Jun. 19, 1996, 10 pages.
David J. Norris, NEC Research Institute, Internet, webpage no later than Apr. 23, 1999, 10 pages.
JΔJ Photonic Crystal Research, Internet, 21 pages.
Photonic Band Engineering MURI, Internet, last update Jul. 13, 1999, 31 pages.
Bell Laboratories, physical sciences research, Lucent Technologies, Internet, Copyright 1999 or 1997, 12 pages.

Latest Photonic and Acoustic Band–Gap Papers Collection, Internet, posted Jul. 27, 1999, 3 pages.
Sajeev John, Theoretical Condensed Matter Physics and Quantum Optics, Internet, at least as early as Jul. 14, 1999, 9 pages.
Daniel T. Colbert, Rice University, Internet, 3 pages.
De La Rue et al., Opal Photonic Microstructures, Internet, Feb. 1, 1999, 4 pages.
Researchers Approach Photonic Bandgaps in Crystals, Technology News, Internet, Jan. 1999, 9 pages.
William B. Russel; Department of Chemical Engineering Princeton University, Internet, 6 pages.
Alice P. Gast, Department of Chemical Engineering, Princeton University, Internet, 4 pages.
The Physics of Colloids in Space (PCS) Project, University of Pennsylvania, Jun. 7, 1998, 5 pages.
Christopher B. Gormon, Internet, last updated Jul. 1998, 7 pages.
Colloidal Disorder–Order Transition (CDOT), NASA, Internet, 6 pages.
Internet search of "colloidal crystal" at IBM website, Jun. 17, 1999, 4 pages.
Internet search of "photonic band gap" at IBM website, Jun. 17, 1999, 3 pages.
Internet search of "photonic crystals" at IBM website, Jun. 17, 1999, 12 pages.
Colloidal Crystal–Review 1995+, Reference Search, SciFinder, Sep. 9, 1999, 40 pages.
SciFinder Reference Search, Mar. 1, 2000, pp. 34–102.
Zirconia Colloid–Review, Reference search, SciFinder, Aug. 28, 2000, 5 pages.
Akira Kose, Reference Search, SciFinder, Apr. 7, 2000, 7 pages.
Samoilovich L.A., Reference Search, SciFinder, Apr. 11, 2000, 17 pages.
Colloidal Crystal Patent + Light/Optic/Photonic/Electronic, Referene Search, SciFinder, Sep. 9, 1999, 42 pages.
Vacuum Belt Filter–> Equip. and App. Reference Search, SciFinder, Sep. 2, 1999, 10 pages.
aerosolpigment, Reference search, SciFinder, Jun. 21, 2000, 10 pages.
Aerosol Semiconductor RBP, Reference Search, SciFinder, Jun. 21, 2000, 11 pages.
Aerosol Film Review, Reference Search, SciFinder, Jun. 21, 2000, 10 pages.
Aerosol TiO2 RBP, Reference Search, SciFinder, Jun. 21, 2000, 19 pages.
Latest Photonic and Acoustic Band–Gap Papers Collection, Internet, posted Sep. 5, 1999, 69 pages.
Photonic and Acoustic Band–Gap Bibliography, Internet, last revised Dec. 19, 1999, 52 pages.
Research with phrase, "aerosol process or aerosol synthesis or aerosol technology," and refined by phrase "nano" to uncover 52 abstracts 20 pages.
Research with phrase, "aerosol process or aerosol synthesis or aerosol technology," and refined by phrase "particle" and document type "book" to uncover 23 abstracts, 9 pages.
Research with phrase, "Photonic Band Gap," and refined to document type "patent" to uncover 49 abstracts, 24 pages.
Research with phrase, "Photonic Band Gap," and refined by document type "Review, Report, Editorial, Dissertation, Book, Biography" to uncover 68 abstracts and bibliographic information, 32 pages.
Research with phrase, "nano but no NaNO2 no NaNO3" selected 1 of 4 candidate topics, Refined by Document Type: Patent, Copyright 1999 ACS, Bibliographic Information, pp. 1–114.
Research with phrase, "Colloidal Crystal" and refined by document type "Patent" and Publication Year "1989–" to uncover 300 abstracts, 141 pages.
Research with phrase, "nano" but not NaNO2 or NaNO3 to uncover 297 abstracts, 114 pages.
Research with phrase, "polymer sphere or polymer latex" and refined by phrase "monosized or uniformly sized or monodispersed" and document type "patent" to uncover 257 abstracts, 40 pages.
Research with phrase, "monodispersed latex" and refined by document type "Book, Patent, or Review" to uncover 89 abstracts, 33 pages.
Research with phrase, "nano" but not "NaNO2 or NaNO3" and refined by document type "Review, Dissertation, Book, and Publication Year 1997–" to uncover 358 abstracts, 166 pages.
Research with phrase, "opal" and refined by document type "Patent" to uncover 250 abstracts, 104 pages.
Research with phrase, "colloidal crystal" and refined by document type "Patent" and Publication Year "–1988" to uncover 268 abstracts, 131 pages.
Research with phrase, "opal" and refined by phrase, "opalescent" to uncover 10 abstracts, 6 pages.
Research with phrase, "Photonic Band Gap" and refined by document type "Patent" to uncover 49 abstracts, 24 pages.
Research with phrase, "photonic crystal" and refined by phrase,"opal" to uncover 40 abstracts, 19 pages.
Research with phrase, "opal" andrefined by phrase, "hydrothermal synthesis" to uncover 28 abstracts, 14 pages.
Application Abstracts of EP application Nos.: EP 97–400411 970225, EP 96–401304 960614, EP 88–307898 880825; Application Abstracts of DE application Nos.: DE 95–19520448.
Application Abstracts of JP application Nos.: JP 97–330388 971201, JP 95–69008 950328, JP 94–54890 940228, JP 92–356783 921222, JP 92–24927 920212; Application Abstracts of WO application Nos.: WO 98–CA1069 981118, WO 97–US14647 970820, WO 96–US3432 960313, WO 96–EP1448 960402, WO 90–US6013 901018; Application Abstracts of US application Nos.: US 96–613194 960308, US 95–576812 951221, US 95–576811 951221; Application Abstracts of DE application Nos.: DE 95–19532543 950904, DE 95–19515820 950429, DE 94–4428851 940804, DE 95–19529332 950809, DE 91–4118185 910603, DE 88–381224 880420.
Research with phrase, "Colloidal Crystal" and refined by document type "Patent" and publication year "1989–" to uncover 292 abstracts, 138 pages.
Research with phrase, "polymer sphere or polymer latex" and refined by phrase, "mono–sized or uniformly sized or monodispersed" and Document Type "Biography" to uncover 65 abstracts, 22 pages.
Research with phrase, "photonic crystal" and refined by phrase, "band gap" to uncover 391 abstracts, 180 pages.
Colloid Crystal and Filtration Reference Search, SciFinder, Sep. 1, 1999, 19 pages.
Gilsonite or French synthetic opal Reference Search, SciFinder, Nov. 2, 1999, 4 pages.
PCT/EP01/12788 International Search Report, mailed Sep. 20, 2002.

* cited by examiner

3D STRUCTURAL SILICEOUS COLOR PIGMENTS

CROSS-REFERENCED TO RELATED APPLICATIONS

This application claims the benefit of U.S. Provisional Application No. 60/253,932 filed Nov. 30, 2000.

FIELD OF THE INVENTION

The field of the invention relates to particles especially 3-D structural color pigments based on solid colloidal crystals of monodispersed spheres, desirably silica spheres, and the manufacturing processes suitable for large-scale production of such solid colloidal crystal products.

The 3-D structural color pigments yield color effects as a result of light diffraction by ordered three-dimensional structures of colloidal silica spheres. They diffract light because the lattice spacings, and therefore, the modulation of refractive index in their structures are in the range of the wavelength of light. The color effects are optimized by adjusting the refractive index difference between the silica spheres and the media in between the spheres. This may be accomplished by partially or completely infiltrating the silica sphere based crystal structure with one or more suitable secondary materials. The resultant high quality colloidal crystals may also be used as photonic crystals for potential photonic and optoelectronic applications.

By way of background, precious opals are well known for their striking color displays. The strong color effect by these natural gemstones typically originates from their unique structures formed by closely packed, uniformly sized silica spheres (Sanders J V, Nature 1964, 204, 1151–1153; Acta Crystallogr. 1968, 24, 427–434). These highly organized structures (super-lattices of silica spheres) with the size of the spheres in the range of wavelength of visible light selectively diffract certain wavelengths and, as a result, provide strong, angle dependent colors corresponding to the diffracted wavelengths. Synthetic opals were produced by crystallizing uniformly sized silica spheres mainly through sedimentation processes (see for example: U.S. Pat. No. 3,497,367). These synthetic gemstones are used as alternatives to the natural opals in the jewelry industries.

Recently, scientists, mainly in academic institutions have discovered that materials with opal-like structures may be used as photonic band gap materials or crystals. An ideal photonic band gap crystal has the capability to manipulate light (photons) the same way as semiconductors manipulate electrons(see John D. Joannopoulos, et al. “Photonic Crystals, Molding of the Light”, Princeton University Press, and Costas M. Soukoulis (ed.), “Photonic Band Gap Materials”, NATO ASI Series E, Vol. 315, Kluwer Academic Publishers). These crystals with complete band gaps hold the promise for future super-fast optical computing and optical communication technologies just as silicon semiconductors did for electronic computing and electronic communication technologies. To achieve a complete band gap, scientists have looked into a variety of different materials and structures. Besides silica spheres, different polymer spheres have also be used to produce opal-like structures (see, for example, Sanford A. Asher, et al. J. Am. Chem. Soc.

The present invention deals with a new type of physical, particles, colorants or pigments with opalescent effect, including 3-D structural color pigments. The particles of the present invention may contain a sphere based crystal structure (or super-lattice) built up by monodisperse spheres and one or more secondary types of much smaller colloidal particles occupying partially or completely the empty spaces between the monodisperse spheres. The smaller colloidal particles in the structure can modify the refractive index contrast between the silica spheres and the media in between them. They also may act as binding agents to hold the sphere based structure more strongly together. The monodisperse spheres suitable for the particles with opalescent effect typically have a standard deviation of the particle size of less than 5%, preferably about 2%.

The existing physical effect pigments or colorants are essentially exclusively based on layered structures with refractive indexes alternating in only one dimension. Typical products include, for example, pearlescent pigments based on bismuth oxychloride or lead carbonate crystalline platelets, interference pigments based mica flakes or alumina flakes, and gonio-chromatic pigments based on silica flakes, metal flakes or liquid crystal platelets. These products have been extensively reviewed by Pfaff and Reynders recently (Chemical Reviews, 1999, 99(7), 1963–1981).

This invention also deals with a method of manufacturing thin layer (flaky) crystals of monodisperse, desirably silica, spheres which can be useful as the 3-D structural color pigments using a substrate coating technology. The substrate may be a static, flat surface or a moving belt. The latter is known as a web coating process (U.S. Pat. No. 3,138,475) which was expanded to produce silica and titania flakes for layered interference colorants (World Patents 93/08237, 97/43346 and 97/43348). This web coating technology is capable of large scale production of 3-D structural color pigments of the current invention. The method may also be used to produce photonic crystals based on normal opal or inverse opal structures suitable for photonic and optoelectronic device applications.

Therefore, this invention may also deal with the use of the particles or of thin layer flaky crystals produced with the method described herein for photonic and optoelectronic device applications.

BRIEF DESCRIPTION OF THE DRAWINGS

Referring now to FIG. 1, in the layered structure case, light beams are partially reflected at each interface between two layers having different refractive index. These reflected beams interfere at one or more directions, which are observed as colors corresponding to the frequencies of the reflected beams. For the higher dimensional structures, light beams are diffracted by the crystal planes in the periodic super-lattices similar to the way that atomic crystals diffract X-rays. Since the higher dimensional structures contain multiple sets of crystal planes, diffracted beams and, therefore, colors may be observed at multiple angles. Typical 2-D structures showing striking color effects include butterfly wings, bird feathers, among many others (see M. Srinivasarao, Chemical Reviews, 1999, 99(7), 1935–1961). Opals are well known for their striking color displays and their structures are based on 3-D super lattices of monodispersed silica spheres.

In the previous art of synthetic opals, silica spheres were first synthesized and fractionated into narrow particle size fractions. Then spheres with the desired size uniformity and range were assembled into closely packed arrays by sedimentation or centrifugation. The packed arrays were finally stabilized by heating or by the use of a cement-like material to bond the spheres together. In recent publications on the synthesis of photonic crystals, specifically designed cells, table top filters, as well as sedimentation processes were used to assemble mono-dispersed polymer or silica spheres into 2-D or 3-D closely packed arrays. A second material typically with high refractive index such as metal oxides, carbon or metal was then introduced into the structure by infiltrating the gaps between the spheres with a desired precursor material followed by certain treatments to convert precursor material into desired material. Finally, the polymer or silica spheres were removed from the structure by chemical or thermal processes. In photonics applications, polymer or silica does not have enough high refractive index to provide a strong optical effect. Infiltration with high refractive index material is generally necessary.

It is also known that high quality color displays by opal or opal-like structures requires not only highly uniform spheres and well-ordered crystal lattices of the spheres but also an optimized contrast of refractive index between the-lattice-forming spheres and the media or the space in between them. JP 7512133 (Japanese) describes artificial opal products with strong colors based on polymer materials, in which the lattice-forming polymer spheres had a refractive index of 1.50 while the infiltrated phase, also a polymer, had a refractive index of 1.42. Colvin, et. al. have also addressed the dependence of optical properties on the refractive index contrast for silica opal structures (Physical Review Letters, 1999, 83(2), 300–303).

The Process

Figure 1:
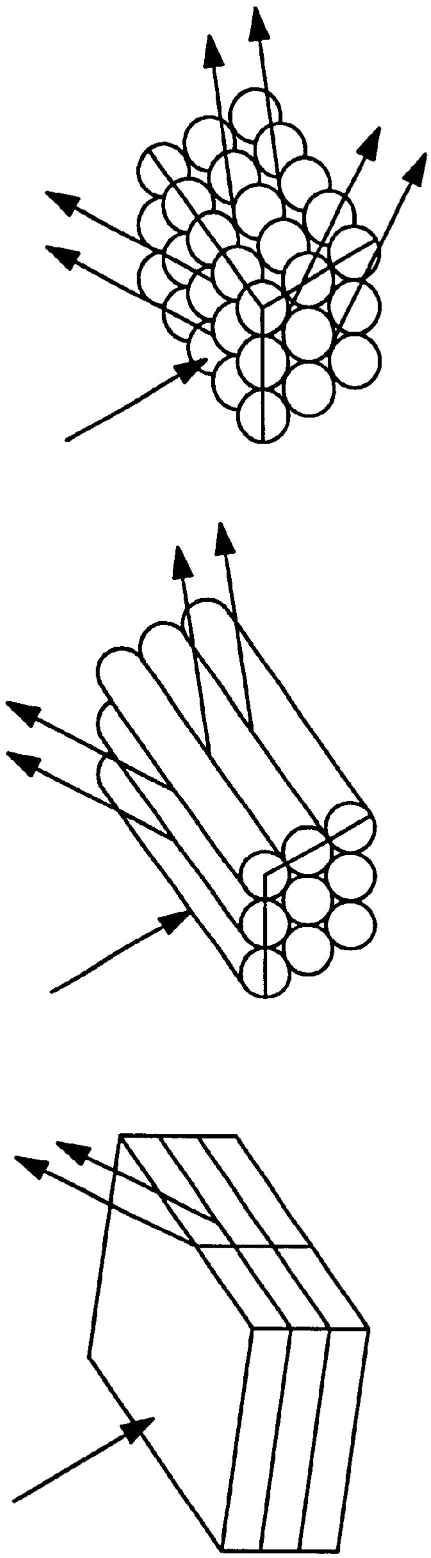
FIG. 1 schematically presents layer-based 1-D, rod-based 2-D and sphere-based 3-D structures and their possible interaction with light.
Figure 2:
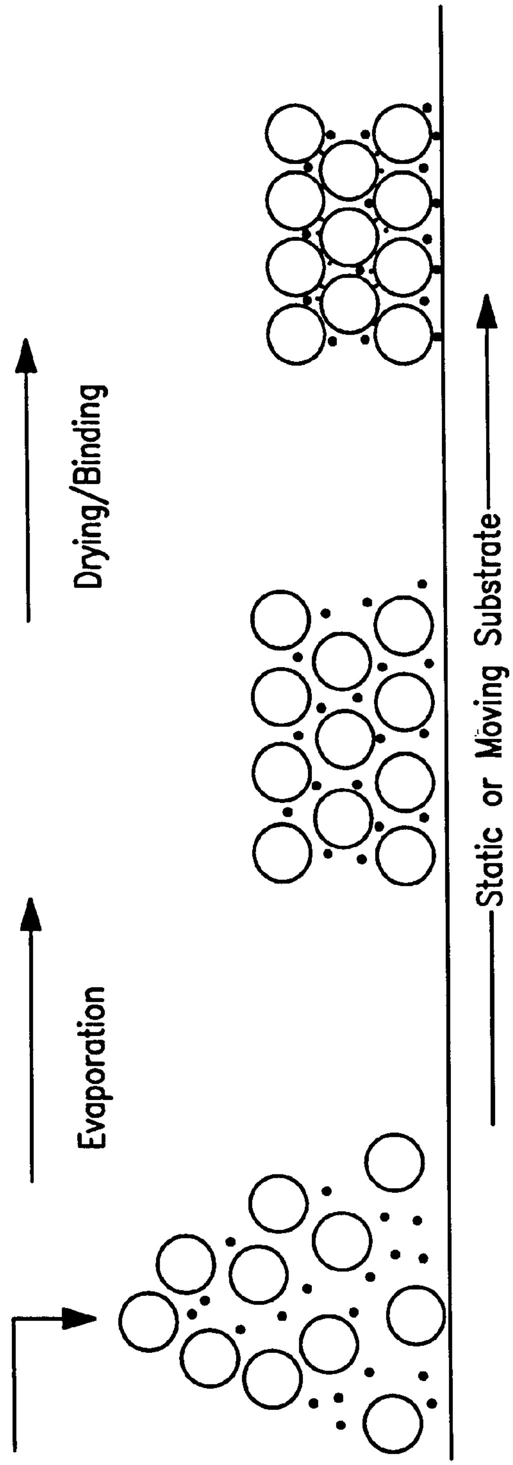
FIG. 2 is a schematic flow sheet of a preferred embodiment of the process of the invention.

In the current invention, a new type of 3-D structural color pigments is produced via a substrate coating process of the type shown in FIG. 2. Typically, the process involves three production stages. In the first stage, the suspension preparation stage, a suspension of monodisperse, desirably silica, spheres is prepared at a suitable concentration, in an appropriate solvent, and with a suitable amount of one or more colloidal species with much smaller particle size than the silica spheres for refractive index adjustment and structure binding. In the second stage, crystallization stage, the suspension is brought onto a flat substrate, static or constantly moving with desired thickness of the suspension layer; the spheres are crystallized into closely packed layers along with the evaporation of the solvent; the crystalline layer is then initially dried and removed from the substrate at small pieces of flakes. In the final stage, the product finishing stage, the crystal flakes are further dried, calcined, milled to reduce the particle size to an appropriate range, and then classified into different fractions of final products.

The monodisperse spheres may comprise almost any materials which are sufficiently transparent for the wavelengths of the desired light reflections, so that this light is able to penetrate several sphere diameters deep into the particle. Preferred spheres comprise metal chalcogenides, preferably metal oxides or metal pnictides, preferably nitrides or phosphides. Metals in the sense of these terms are all elements which may occur as an electropositive partner in comparison to the counterions, such as the classic metals of the transition groups and the main group metals of main groups one and two, but also including all elements of main group three and also silicon, germanium, tin, lead, phosphorous, arsenic, antimony and bismuth. The preferred metal chalcogenides and metal pnictides include, in particular, silicon dioxide, aluminum oxide, titanium dioxide, zirconium dioxide, gallium nitride, boron nitride and aluminum nitride and also silicon nitride and phosphorous nitride.

Monodispersed silica spheres may be prepared following the well-known process by Stober, Fink and Bohn (J. Colloid Interface Sci. 1968, 26,62). The process was later refined by Bogush, et. al. (J. Non-Crys. Solids 1988, 104, 95). The silica monospheres used in the current invention can be purchased from Merck, KGaA or they can be freshly prepared by the process of U.S. Pat. Nos. 4,775,520 and 4,911,903. Particularly, the spheres are produced by hydrolytic polycondensation of tetraalkoxysilanes in an aqueous-ammoniacal medium, a sol of primary particles being produced first of all and then the $SiO_2$ particles obtained being brought to the desired particle size by continuous, controlled addition of tetraalkoxysilane. With this process it is possible to produce monodisperse $SiO_2$ spheres having average particle diameters of between 0.05 and 10 $\mu$m with a standard deviation of 5%.

Further preferred starting material comprises $SiO_2$ spheres coated with nonabsorbing metal oxides, such as $TiO_2$, $ZrO_2$, $ZnO_2$, $SnO_2$ or $Al_2O_3$, for example. The production of $SiO_2$ spheres coated with metal oxides is described in more detail in U.S. Pat. No. 5,846,310, DE 198 42 134 and DE 199 29 109, for example. Coating with absorbing metal oxides, such as the iron oxides $Fe_3O_4$ and/or $Fe_2O_3$, also leads to particles which may be used in accordance with the invention.

As starting material it is also possible to use monodisperse spheres of nonabsorbing metal oxides such as $TiO_2$, $ZrO_2$, $ZnO_2$, $SnO_2$ or $Al_2O_3$ or metal oxide mixtures. Their preparation is described, for example, in EP 0 644 914. Furthermore, the process according to EP 0 216 278 for producing monodisperse $SiO_2$ spheres may be transferred readily and with the same result to other oxides. To a mixture comprising alcohol, water and ammonia, whose temperature is set precisely using a thermostat to 30–40° C., tetraethoxysilane, tetrabutyoxytitanium, tetrapropxyzirconium or mixtures thereof are added in one shot with intensive mixing and the resulting mixture is stirred intensively for a further 20 seconds, forming a suspension of monodisperse spheres in the nanometer range. Following a post-reaction period of from 1 to 2 hours, the spheres are separated off in a conventional manner, by centrifuging, for example, and are washed and dried.

Monodisperse polymer spheres as well, for example polystyrene or polymethyl methacrylate, may be used as starting material for the production of the particles of the invention. Spheres of this kind are available commercially. Bangs Laboratories Inc. (Carmel, USA) offer monodisperse spheres of a very wide variety of polymers.

Further suitable starting material for producing the pigments of the invention comprises monodisperse spheres of polymers which contain included particles, for example metal oxides. Such materials are offered by the company micro caps Entwicklungs-un Vertriebs GmbH in Rostock, Germany. In accordance with customer-specific requirements, microencapsulations are manufactured on the basis of polyesters, polyamides and natural and modified carbohydrates.

It is further possible to use monodisperse spheres of metal oxides coated with organic materials, for example silanes. The monodisperse spheres are dispersed in alcohols and modified with common organoalkoxysilanes. The silanization of spherical oxide particles is also described in DE 43 16 814.

The suspension ready for crystallization may be simply prepared by mixing a silica sphere suspension and the sols containing the desired colloid species if they are already in a desired solvent in a desired concentration. However, extra steps may be needed to prepare the suspension. Typically, a suspension of silica spheres is mixed with desired amounts of one or more smaller particle species regardless of their solvents and concentrations. The resultant suspension is centrifuged to separate the particles from their solvents. Then the particle mixture is redispersed in a desired solvent and at a suitable concentration ready for crystallization. The redispersion may be done by mechanical mixing and agitation followed by, if necessary, ultrasonic treatment. If necessary, the centrifugation and redispersion may be repeated one or more times before proceeding to the crystallization stage.

The concentration of the silica suspension for crystallization may vary from ~5% to ~65% in weight. A preferred concentration is from ~20% to ~50%. For a moving substrate process, a concentration from ~40% to ~50% is more preferred. A large number of different solvents may be used for the preparation of the suspension. Examples include but are not limited to water, ethanol, methanol, 1- or 2-propanol, acetone, acetonitrile, dichloromethane, methyl chloroform, methyl acetate, butyl acetate, ethylene glycol, among many others. The preferred solvents are water and ethanol on the basis of economic, health, safety and environmental considerations. If a high production yield is desired, especially in the case that a continuously moving substrate is used, ethanol is more preferred than water. A thin layer of the ethanol suspension on an appropriate substrate can be crystallized (solvent removed) rapidly even under normal evaporation conditions. With the help of an infrared heater, the solvent removal may be completed in a couple of minutes without compromising much of the crystalline quality.

For the crystals that work in the visible light range for color pigment applications, the preferred silica sphere size ranges from ca. 150 nm to ca. 450 nm. The sphere size for the reflection of certain wavelength may be estimated using the Bragg equation, $\lambda=2nd \sin \theta$, where $\lambda$ is the wavelength diffracted, n is the refractive index of the structure, d is the plane spacing, and $\theta$ in the Bragg glancing angle. For example, the longest wavelength ($\theta=\pi/2$) diffracted by the 10 planes of a hexagonal close packed structure ($d=r\sqrt{3}$, r is the radius of the spheres) would be: $\lambda=5.02$ r (assuming n=1.45 for the structure based on amorphous silica spheres). The size of the secondary colloid species used for refractive index adjustment and structure stabilization may vary from ~5 nm up to about one-third in diameter of the size of the silica spheres used. Preferably, it is from ~10 nm to ~50 nm. Too large a size of the colloid species may cause structural distortions and reduce the optical effect.

Examples of the colloidal species that may be used include but are not limited to metal oxide sols e.g. $SiO_2$, $Al_2O_3$, $TiO_2$, $SnO_2$, $Sb_2O_5$, $Fe_2O_3$, $ZrO_2$, $CeO_2$ and $Y_2O_3$; metal colloids e.g. gold, silver and copper; and colloidal polymers such as, for example, poly(methyl methacrylate), poly(vinyl acetate), polyacrylonitrile and poly(styrene-co-butadiene). There are two important criteria in selecting the colloidal species for the preparation. There has to be at least one colloidal species that can effectively adjust the refractive index ratio to achieve a desired color effect. There also has to be at least one colloidal species that can effectively bind the structure together with enough mechanical strength after final treatment. It is possible that one colloidal species does both refractive index adjustment and binding. In this case, only one species is necessary. The optimum amount of the colloidal species needed can be determined experimentally by routine experimentation. The optimized amount of the colloids would result in the best crystal quality, the best color quality and highest mechanical stability. Typically, it varies from ~5% to ~25% in weight with respect to the silica spheres used. In the cases where centrifugation is needed in the suspension preparation, an extra amount of the colloidal species is needed taking into account the possible incomplete isolation of the smaller colloid particles.

Examples of substrate materials that may be used for the production of thin layer crystals of silica spheres include but are not limited to glass, metals, e.g. stainless steel and aluminum, and polymer materials e.g. polypropylene, polystyrene, poly(methyl pentene), polycarbonate, poly(ethylene terephthalate), just to name a few. Pretreatment of the substrate surface with dilute acids or bases may be needed in order to make it more wettable for the colloid suspension to be used. If a moving substrate for large scale production is concerned, polymer materials are preferred due to their flexibility and low cost.

The thickness of the silica sphere based crystal layers may be estimated by taking into account the amount and concentration of the suspension, and surface area of substrate being covered. For a moving substrate, it is also related to the application rate of the suspension and the moving speed of the substrate. Achievable layer thicknesses by this process ranges from ~20 $\mu$m to over 5 mm, preferably, ~100 $\mu$m to ~1000 $\mu$m. Evaporation crystallization and initial stage drying may be accomplished either at room temperature or under heat. Preferred heaters are those that use infrared irradiation sources, which may be easily incorporated into a web-coating equipment for the moving substrate process. The collection of the layered crystals as millimeter sized flakes may be done by simply brushing them off the substrate. At this stage, the crystals are not fully stabilized and still fragile. Excess mechanical impact should be avoided to keep the sphere based structure intact. Then the crystals undergo finishing treatments and are processed into final products. Typical finishing steps include drying, heat treatment or calcination, milling, and classification. For a whole inorganic crystal product, the calcination temperature ranges from 400° C. to 1100° C., preferably from 600° C. to 800° C.

An alternative modified substrate coating method may also be used to produce 3-D color pigments with controlled crystal size and shape. In this way, the milling and classification steps in the product finishing stage described above may not be needed. The key modification to the above method is the selection of substrate materials. Unlike the above method, where the substrate and the suspension are compatible so that the suspension can very well wet the substrate, an incompatible substrate is chosen. Instead of a uniform layer, the suspension would stay on the substrate as individual small drops. After evaporation/crystallization, these drops would become solid crystalline particles. The size of the crystalline particles may be controlled by controlling the size of the drops and the concentration of the suspension. The shape of the crystalline particles may be controlled to certain degrees by changing substrates or by changing the surface nature of a substrate. This way, one may be able to control the contact angle of a suspension on a substrate. By adjusting the contact angle, one may be able to achieve disc-like, ring-like and even ball-like particles. In the lab scale, micro pipettes or syringes may be used to generate the droplets. At larger scale, spraying devices or even inkjet technology may be used. Solid substrates are preferred. For example, any hydrophobic polymer substrate may be used for water suspension and a hydrophyllic polymer substrate can be used for oil suspensions. A Teflon substrate in particular, may be used for both water and ethanol suspensions. This would thus be an improvement over the method of Velev et. al generating shape controlled, polymer sphere based photonic crystals (Science, 2000, 287, 2240) by carrying out crystallization on a surface of a fluorinated oil.

Potential application areas of the 3-D structural color pigments include coatings, paints, cosmetic formulations and polymer plastics. The pigments would be incorporated in the formulation in an analogous manner to known formulation containing 2-D color pigments.

In the foregoing and in the following examples, all temperatures are set forth uncorrected in degrees Celsius; and, unless otherwise indicated, all parts and percentages are by weight.

The entire disclosure of all applications, patents and publications, cited above and below is hereby incorporated by reference, and of corresponding PCT Application No. PCT/EP 01/12788, filed Nov. 5, 2001, and U.S. Provisional Application No. 60/253,932, filed Nov. 30, 2000.

EXAMPLE 1

A Merck KGaA's silica monospheres were used as raw materials for the production of the 3-D structural color pigment of this invention. The particle size of the silica spheres is 250 nm with polydispersity of less than 5% (also known as coefficient of variation=standard deviation/mean diameter). The sample came as a water suspension at a concentration of 11% in weight. 120 g of silica sphere suspension was mixed with 8 g of a silica sol from Nissan Chemicals (Snowtex-40) having a particle size distribution of 11–14 nm and a concentration of 40–41% in water. The mixture was centrifuged at 3000 rpm for 30 minutes to separate the solid from the liquid. The solid was redispersed in anhydrous ethanol (reagent grade from Alfa Aesar) to the original volume by mechanical stirring and ultrasonic treatment. The solid was separated again by centrifugation and redispersed again in ethanol to the half of the original volume. The suspension so prepared was divided into 4 equal parts and each was added to a glass Petri dish having a flat bottom and about 175 $cm^2$ in surface area. The suspension films in the dishes were left to evaporate/crystallize at room temperature overnight. Then the initially dried crystalline films was collected as small irregular shaped platelets, dried at 110° C. for 6 hours and calcined at 800° C. for 8 hours. The platelets were finally ground into smaller sizes and screened to desired size ranges. The product showed a strong greenish diffraction color at a viewing angle close to normal axis of the crystalline surface and reddish color at an angle far away from the normal axis.

EXAMPLE 2

Figure 3A:
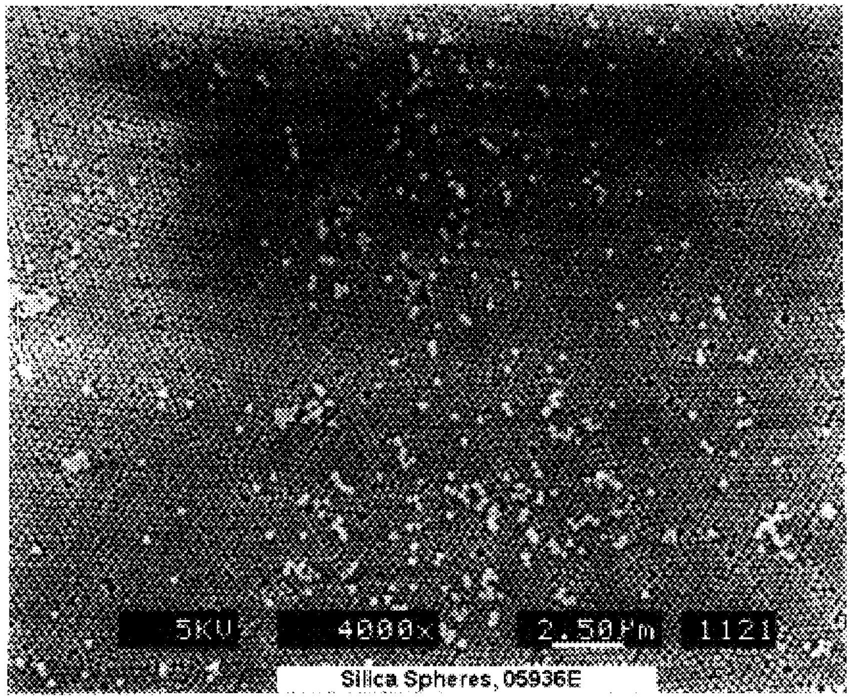
FIGS. 3A and 3B are electron micrographs of silica sphere crystals.
Figure 3B:
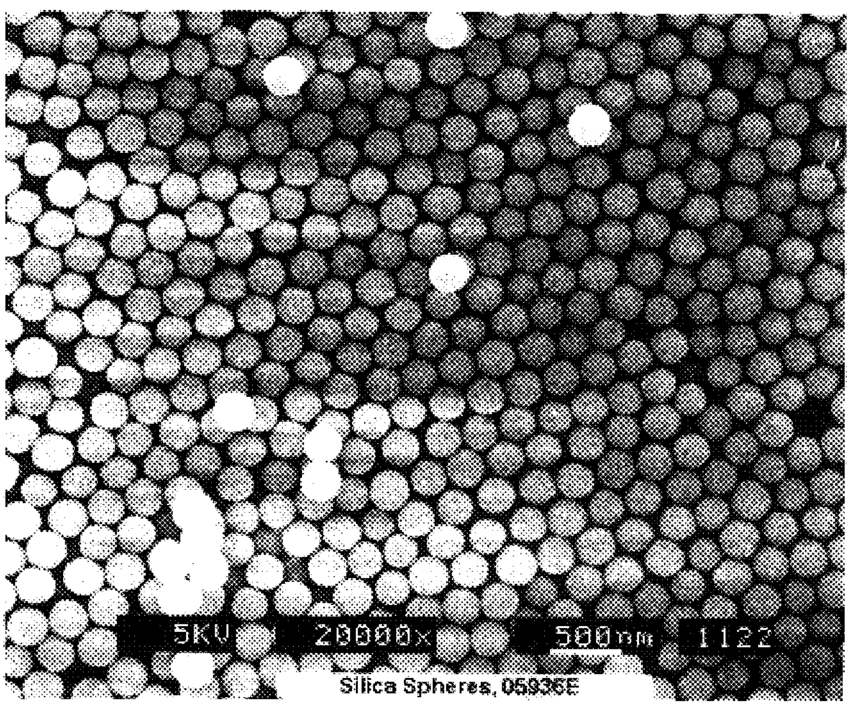

Same as in Example 1, but 8 g of tin(IV) oxide sol was used instead of silica sol. The tin oxide sol was purchased from Alfa Aesar having an average particle size of 15 nm and a concentration of 15 wt. % in water dispersion. Both the colors and mechanical strength were comparable to the product from Example 1. The resultant products are shown in FIGS. 3A and 3B. In FIG. 3A the spheres are shown bound together with nanometer sized tin oxide colloids. In the higher magnification of FIG. 3B, the necks formed by the tin oxide colloid between neighboring spheres are clearly visible.

EXAMPLE 3

Same as in Example 1, but 4 g of the silica sol as in Example 1 and 4 g of $SnO_2$ sol as in Example 2 was used. The product showed both colors and mechanical strength comparable to that from Example 1.

EXAMPLE 4

Same as in Example 1, but Petri dishes made of polymethylpentene instead of glass were used. The evaporation/crystallization was performed under a infrared heater at about 50° C. The process was virtually completed in about 15 minutes. The product shows comparable properties as that from Example 1.

EXAMPLE 5

120 g of the silica sphere suspension same as that used in Example 1 was added to glass cylinder and was left undisturbed for 3 days at room temperature. At the bottom of cylinder, a layer of colloidal crystal formed as indicated by strong iridescent colors. The colloidal crystal portion was collected by gently decanting away the upper liquid. Then concentrated suspension collected this way was mixed with 1.5 g of Snowtex-40 as in Example 1. The mixture was added into 2 glass dishes and evaporated at room temperature for about 24 hours. The product was further processed the same way as described in Example 1. It showed comparable color and mechanical strength.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A particle matrix with opalescent effect comprising monodisperse spheres and one or more secondary types of much smaller colloidal particles occupying partially or completely the empty spaces between the monodisperse spheres wherein the colloidal particles effectively adjust the refractive index ratio between the sphere and the media between them to achieve a predetermined color effect and bind the matrix together.

2. A particle matrix according to claim 1, wherein the size of the monodisperse spheres range from about 150 nm–about 450 nm.

3. A particle matrix according to claim 1, wherein the monodisperse spheres are transparent and comprise metal chalcogenide, metal pnictide, an organic polymer, or a metal oxide.

4. A particle matrix according to claim 1, wherein the size of the secondary colloid species ranges about 5 nm up to about one-third in diameter of the size of the monodisperse spheres.

5. A particle matrix according to claim 1, wherein the colloidal species comprise a metal oxide sol of $SiO_2$, $Al_2O_3$, $TiO_2$, $SnO_2$, $Sb_2O_5$, $Fe_2O_3$, $ZrO_2$, $CeO_2$ or $Y_2O_3$; and/or metal colloid of gold, silver or copper; and/or a colloidal polymer of poly(methyl methacrylate), poly(vinyl acetate), polyacrylonitrile or poly(styrene-co-butadiene).

6. A particle matrix to claim 1, wherein the colloidal species are present in an amount of from about 5%-by-weight to about 25%-by-weight with respect to the monodisperse spheres.

7. A particle matrix according to claim 1, wherein the particles show an opal structure.

8. A particle matrix according to claim 1, wherein the particles show an inverse opal structure.

9. A particle matrix according claim 1, wherein the particle matrix comprises thin layer crystals with a layer thickness from about 20 $\mu$m–about 5 mm.

10. A particle matrix according to claim 1, wherein the monodisperse spheres are silica spheres.

11. A particle matrix according to claim 1, wherein the monodisperse spheres have a particle size standard deviation of less than 5%.

12. A photonic and optoelectronic device comprising a particle matrix according to claim 1.

13. A method of manufacturing a thin layer of a particle matrix according to claim 1 by coating a substrate with monodisperse spheres.

14. A method according to claim 13, comprising preparing a suspension of monodisperse spheres at an effective concentration, in an effective solvent, and with an effective amount of one or more colloidal species with much smaller particle size than the monodisperse spheres.

15. A method according to claim 13, comprising depositing a suspension onto a flat substrate, static or constantly moving with desired thickness of the suspension layer and optionally the crystalline layer, and then initially drying and removing from the substrate small pieces of flakes.

16. A method according to claim 13, further comprising drying, optionally calcining, and milling to reduce the particle size to an appropriate range, and optionally classifying into different fractions of final products.

17. A method according to claim 13, wherein a concentration of a suspension of monodisperse spheres for crystallization is in the range from about 5%-by-weight–about 65%-by-weight.

18. A method according to claim 13, wherein the substrate comprises glass, a metal, or a polymer material.

19. A method according to claim 13, wherein the substrate surface is pretreated with dilute acids or bases in order to make it more wettable for the colloid suspension.

20. A method according to claim 13, wherein the substrate comprises stainless steel, aluminum, polypropylene, polystyrene, poly(methylpentene), polycarbonate, or poly (ethylene terephthalate).

* * * * *